(12) United States Patent
Wang et al.

(10) Patent No.: US 11,884,793 B2
(45) Date of Patent: Jan. 30, 2024

(54) MOLDED ARTICLE WITH METALLIC APPEARANCE

(71) Applicant: The Procter & Gamble Company, Cincinnati, OH (US)

(72) Inventors: Ping Wang, Beijing (CN); Liang Yang, Beijing (CN); Ruizhi Pei, Beijing (CN); Shuo Song, Beijing (CN); Fang Chen, Beijing (CN); Zihui Xu, Beijing (CN)

(73) Assignee: The Procter & Gamble Company, Cincinnati, OH (US)

( * ) Notice: Subject to any disclaimer, the term of this patent is extended or adjusted under 35 U.S.C. 154(b) by 462 days.

(21) Appl. No.: 17/074,709

(22) Filed: Oct. 20, 2020

(65) Prior Publication Data

US 2021/0130571 A1   May 6, 2021

(30) Foreign Application Priority Data

Oct. 30, 2019 (WO) ................ PCT/CN2019/114256
Sep. 30, 2020 (WO) ................ PCT/CN2020/119228

(51) Int. Cl.
| | |
|---|---|
| *C08K 3/08* | (2006.01) |
| *C08K 7/00* | (2006.01) |
| *C08J 3/22* | (2006.01) |
| *C08J 5/18* | (2006.01) |
| *B29C 45/00* | (2006.01) |
| *B29K 505/00* | (2006.01) |

(Continued)

(52) U.S. Cl.
CPC ............ *C08K 3/08* (2013.01); *B29C 45/0013* (2013.01); *C08J 3/226* (2013.01); *C08J 5/18* (2013.01); *C08K 7/00* (2013.01); *B29K 2101/12* (2013.01); *B29K 2105/16* (2013.01); *B29K 2505/00* (2013.01); *C08J 2323/12* (2013.01); *C08K 2003/0812* (2013.01); *C08K 2201/003* (2013.01); *C08K 2201/004* (2013.01); *C08K 2201/016* (2013.01)

(58) Field of Classification Search
None
See application file for complete search history.

(56) References Cited

U.S. PATENT DOCUMENTS

| | | |
|---|---|---|
| 5,766,334 A | 6/1998 | Hashizume et al. |
| 8,691,138 B2 | 4/2014 | Kang |

(Continued)

FOREIGN PATENT DOCUMENTS

| | | |
|---|---|---|
| CN | 102134341 A | 7/2011 |
| CN | 102134357 A | 7/2011 |

(Continued)

OTHER PUBLICATIONS

AA01380FM PCT Supplementary Search Report and Written Opinion for PCT/CN2020/119228 dated Jan. 26, 2022, 8 pages.

(Continued)

*Primary Examiner* — Jeffrey D Washville
(74) *Attorney, Agent, or Firm* — William E. Gallagher; Sarah M. Decristofaro; James Ernest Oehlenschlager (57) ABSTRACT

The present invention relates to a molded article with a metallic appearance and a process for making the same. Particularly, the present invention relates to a molded article having a part that comprises a layer with a sandwich structure.

12 Claims, 4 Drawing Sheets

(51) Int. Cl.
  *B29K 101/12*   (2006.01)
  *B29K 105/16*   (2006.01)

(56) References Cited

U.S. PATENT DOCUMENTS

| | | | |
|---|---|---|---|
| 2009/0093568 A1* | 4/2009 | Lacock | B32B 27/18 |
| | | | 523/171 |
| 2013/0150480 A1 | 6/2013 | Kim et al. | |
| 2014/0221547 A1 | 8/2014 | Kim | |
| 2017/0283563 A1 | 10/2017 | Overend | |
| 2018/0223087 A1 | 8/2018 | Bernhardt et al. | |
| 2019/0001628 A1 | 1/2019 | Nakashima | |

FOREIGN PATENT DOCUMENTS

| | | |
|---|---|---|
| CN | 102134366 A | 7/2011 |
| CN | 102134367 A | 7/2011 |
| CN | 102372904 A | 3/2012 |
| CN | 103910941 B | 8/2016 |
| CN | 105968683 B | 9/2016 |
| CN | 106117803 A | 11/2016 |
| CN | 104479427 B | 1/2017 |
| CN | 103881284 B | 7/2017 |
| CN | 105037880 B | 4/2018 |
| CN | 105733318 B | 5/2018 |
| CN | 107868342 A | 2/2020 |
| EP | 2842993 A1 | 3/2015 |
| JP | S6463114 A | 3/1989 |
| JP | 2002256151 A | 9/2002 |
| JP | 03994245 B2 | 8/2007 |
| JP | 2012072363 A | 4/2012 |
| JP | 05338644 B2 | 8/2013 |
| JP | 2014065792 A | 4/2014 |
| JP | 2013108010 A | 10/2019 |

OTHER PUBLICATIONS

International Search Report and Written Opinion; Application Ser. No. PCT/CN2020/119228; dated Jan. 6, 2021, 11 pages.
International Search Report and Written Opinion dated Oct. 30, 2019, PCT/CN2019/114256, 9 pgs.

* cited by examiner

MOLDED ARTICLE WITH METALLIC APPEARANCE

FIELD OF THE INVENTION

The present invention relates to a molded article with a metallic appearance and a process for making the same.

BACKGROUND OF THE INVENTION

Articles made of thermoplastic materials have been widely used in consumer goods, such as packages for hair care products (for example shampoo), beauty care products (for example cosmetics), fabric care products (for example, liquid detergent), food and household products. Metallic appearance (or also called "metallic effect") is perceived as a premium appearance by consumers. It is getting more and more popular for molded plastic articles. To achieve the metallic appearance, a conventional manufacturing process is to employ a post-molding decoration process, such as vacuum metallization, sputtering, spraying or painting, to form a metallic coating over the molded plastic articles. However, those post-molding decoration processes can cause a series of problems including environmental pollution, safety hazards, inconsistent quality, no recyclability, and poor durability. Particularly, the defect rate of products treated by those post-mold decoration processes is high. Also, the coating material may peel off in the presence of some chemicals or due to the rotation of hinges for those products with hinges. Furthermore, the scratching resistance may not be good enough for transportation and handling. The cost is another disadvantage because such processes are quite expensive.

Recently, an alternative technique has been developed for providing a metallic appearance. Particularly, metal particles may be added as a pigment or masterbatch into the thermoplastic material before molding, so that the metal particles are distributed throughout the molded article formed by the thermoplastic material, resulting in a metallic effect. However, the metallic appearance of molded articles is not satisfied by the consumers, and in other words, the appearance is still 'plasticky' to some extent (i.e., the appearance being closer to plastic rather than metal). Particularly, the reflectivity of such molded articles is not high enough. More particularly, such molded articles may not have certain desirable parameters needed to effectuate a metallic appearance, for example high glossiness (i.e., a high SAMBA Glossiness value) and refined dullness (i.e., a reduced Dullness value).

Therefore, there is still a need to provide a molded article with an improved metallic appearance as well as a more environmentally friendly, affordable process for preparing such molded article.

SUMMARY OF THE INVENTION

Surprisingly, the present inventors found that a molded article exhibits an unexpectedly improved metallic appearance when metallic flakes are distributed within the thermoplastic materials so as to form a so-called "sandwich" structure. The molded article according to the present disclosure may achieve a super metallic effect close to real metallic coating.

The present invention relates to a molded article with a metallic appearance, in which the article comprises a layer having a significant "sandwich" structure and which is formed by molding a blend of a thermoplastic material and metallic flakes. Particularly, in the cross-section image of the molded article, a bright line can be seen in the middle, because metallic flakes are not uniformly distributed throughout the layer but are concentrated in the middle along the thickness of the layer, i.e., forming a so-called "sandwich" structure. The "sandwich" structure may bring about many benefits that consumers want (for example, improved metallic appearance, recyclability, and affordability), as compared to a molded layer containing the same level of metallic flakes that are evenly distributed throughout the layer.

Particularly, the metallic flakes in the molded articles according to the present invention may be characterized by: i) an average maximum diameter of from about 1 μm to about 100 μm, preferably from about 3 μm to about 50 μm, more preferably from about 5 μm to about 30 μm, and most preferably from about 7 μm to about 20 μm, for example 5 μm, 6 μm, 7 μm, 8 μm, 9 μm, 10 μm, 12 μm, 14 μm, 16 μm, 18 μm or any ranges therebetween; and/or ii) an average thickness of from about 0.01 μm to about 10 μm, preferably from about 0.05 μm to about 1 μm, more preferably from about 0.10 μm to about 0.50 μm, and most preferably from about 0.15 μm to about 0.35 μm, for example 0.10 μm, 0.12 μm, 0.14 μm, 0.16 μm, 0.18 μm, 0.20 μm, 0.22 μm, 0.24 μm, 0.26 μm, 0.28 μm or any ranges therebetween; and/or iii) an aspect ratio of an average diameter to an average thickness ranging from about 3 to about 1,000, preferably from about 5 to about 500, more preferably from about 10 to about 200, and most preferably from about 30 to about 100, for example 10, 15, 18, 20, 25, 30, 35, 40, 45, 50, 55, 60, 65, 70, 80, 90 or any ranges therebetween.

According to one aspect of the present invention, there is provided a molded article having at least one part that comprises at least one layer comprising: a) from about 50% to about 99.99% of a thermoplastic material by weight of said layer, and b) from about 0.01% to about 50% of metallic flakes by weight of said layer; wherein the ratio of Middle Flake Density of the layer over Surface Flake Density of the layer is at least 3.

According to another aspect of the present invention, there is provided a process for making a molded article, comprising the steps of: a) mixing a thermoplastic material and metallic flakes to form a blend, in which the blend comprises from about 50% to about 99.99% of said thermoplastic material and from about 0.01% to about 50% of said metallic flakes by weight of said blend; and b) injecting said blend obtained in step a) in a mold to form the molded article.

BRIEF DESCRIPTION OF THE DRAWINGS

While the specification concludes with claims, it is believed that the same will be better understood from the following description taken in conjunction with the accompanying drawings in which:

FIGS. 3A and 3B shows SEM imaging of a cross-section of an inventive molded article, in which in which FIG. 4B: 2%; FIG. 4C: 10%; FIG. 4D: 40%).

DETAILED DESCRIPTION OF THE INVENTION

It has surprisingly been found by the inventors of the present invention that the molded article according to the present disclosure can have a special "sandwich" structure, in which the concentration and orientation of metallic flakes are quite different between the middle portion and the surface portion along the thickness of the metallic flakes. Without wishing to be bound by any theory, it is believed that the overall concentration and orientation of metallic flakes and surface smoothness of flakes contributes to the metal appearance. As such, two parameters, i.e., Middle Flake Density and Surface Flake Density, are employed to characterize the overall of concentration and orientation of metallic flakes respectively for the middle portion and the surface portion. Furthermore, without wishing to be bound by any theory, it is also believed that the special "sandwich" structure may result from a particular shape (for example, a shape of small, thin sheets) and/or composition (for example, the presence of a coating) of metallic flakes.

Particularly, according to one aspect of the present invention, there is provided a molded article having at least one part that comprises at least one layer comprising: a) from about 50% to about 99.99% of a thermoplastic material by weight of said layer, and b) from about 0.01% to about 50% of metallic flakes by weight of said layer; wherein the ratio of Middle Flake Density of the layer over Surface Flake Density of the layer is from about 3 to about 1000, preferably from about 4 to about 500, more preferably from about 5 to about 300, most preferably from about 6 to about 100.

In some embodiments, the Middle Flake Density of the layer is from about 30 to about 100, preferably from about 35 to about 99, more preferably from about 40 to about 98, most preferably from about 45 to about 90; and/or the Surface Flake Density of the layer is from about 0.1 to about 20, preferably from about 0.5 to about 15, more preferably from about 1 to about 12, most preferably from about 2 to about 10.

Furthermore, another parameter, i.e., Surface Flake Orientation, is employed to characterize the orientation of metallic flakes for the surface portion along the direction that is parallel to the surface of the molded article (i.e., the degree of the maximum surface of metallic flakes being parallel to the surface of the molded article). Particularly, the higher is the degree of the maximum surface of metallic flakes being parallel to the surface of the molded article, the lower is the Surface Flake Orientation value. In some embodiments, Surface Flake Orientation of the layer is no more than about 20°, preferably no more than about 15°, more preferably no more than about 10°, most preferably no more than about 8°.

Definitions

All percentages are weight percentages based on the weight of the composition, unless otherwise specified. All ratios are weight ratios, unless specifically stated otherwise. All numeric ranges are inclusive of narrower ranges; delineated upper and lower range limits are interchangeable to create further ranges not explicitly delineated. The number of significant digits conveys neither limitation on the indicated amounts nor on the accuracy of the measurements. All measurements are understood to be made at about 25° C. and at ambient conditions, where "ambient conditions" means conditions under about one atmosphere pressure and at about 50% relative humidity.

"Article", as used herein refers to an individual molded object for consumer usage, e.g., a shaver, a toothbrush, a battery, or a container suitable for containing compositions. Preferably the article is a container, non-limiting examples of which include a bottle, a tottle, a jar, a cup, a cap, and the like. The term "container" is used to broadly include elements of a container, such as a closure or dispenser of a container. The compositions contained in such a container may be any of a variety of compositions including, but not limited to, detergents (e.g., laundry detergent, fabric softener, dish care, skin and hair care), beverages, powders, paper (e.g., tissues, wipes), beauty care compositions (e.g., cosmetics, lotions), medicinal, oral care (e.g., tooth paste, mouth wash), and the like. The container may be used to store, transport, or dispense compositions contained therein. Non-limiting volumes containable within the container are from 10 ml, 100 ml, 500 ml or 1000 ml to 1500 ml, 2000 ml or 4000 ml.

"Layer" as used herein means a macro-scale layer of the material forming an article. Typically, the macro-scale layer has a thickness of from about 0.01 mm, 0.1 mm, 0.2 mm, 0.3 mm, 0.4 mm, or 0.5 mm to about 1 mm, 1.5 mm, 2 mm, 2.5 mm, 3 mm, 3.5 mm, 4 mm, 5 mm, 10 mm, 20 mm or 30 mm "By weight of one layer" refers to the percentage of the ingredient by weight of the layer where it is present, rather than by weight of the whole article (unless, of course, the whole article is formed of a single layer).

As used herein, the term of "metallic flake(s)" means a small, thin sheets comprising a metal that may be used as a type of paint for automobiles and some other industries. Particularly, the term of "metallic flake(s)" used herein does not cover metal particles having a spherical shape. It may create a shining or sparkling effect mimicking a metal surface. Usually, the metallic flakes may comprise a metal and/or an oxide thereof, preferably aluminum and/or an oxide thereof, silver and/or an oxide thereof, copper and/or an oxide thereof, gold and/or an oxide thereof, palladium and/or an oxide thereof, chrome and/or an oxide thereof, or any combinations thereof, more preferably aluminum and/or an oxide thereof.

As used herein, the articles including "a" and "an" when used in a claim, are understood to mean one or more of what is claimed or described.

As used herein, the terms "comprise", "comprises", "comprising", "include", "includes", "including", "contain", "contains", and "containing" are meant to be non-limiting, i.e., other steps and other ingredients which do not affect the end of result can be added. The above terms encompass the terms "consisting of" and "consisting essentially of".

Article

The term "article" refers to items, packaging or containers formed by a molding process. Such packaging or containers may be suitable for containing different compositions, including, but not limited to detergents (e.g., laundry care, dish care, skin and hair care), beverages, powders, paper (e.g., tissues, wipes), beauty care compositions (e.g., cosmetics, lotions), medicinal or oral care products (e.g., toothpaste, mouth wash), etc. The compositions may be liquid, semi-liquid, solid, semi-solid, gel, emulsion, aerosol, foam, gaseous, or a combination thereof. The article may be used to store, transport, or dispense compositions contained therein. Other molded articles may include e.g., a bottle, a cap, a pump, a box, a tottle, a jar, and a cup. The article may be an intermediate form that may be further processed in another molding process, for example a preform. Particularly, the preform may be a preform for ISBM (i.e., a preform is molded by injection molding process and then cooled and put through the stretch blow molding process).

The article according to the present disclosure may comprise at least one layer, for example, one layer, two layers, or three layers. In some embodiments, the layer may be not laminated.

The individual layer of the article may comprise from 85% to 99.9%, preferably from 90% to 99.8%, more preferably from 95% to 99.6%, of said thermoplastic material by weight of said layer; and/or from 0.1% to 15%, preferably from 0.2% to 10%, more preferably from 0.4% to 5%, for example 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.5%, 3%, 3.5%, 4%, 4.5%, 5% or any ranges therebetween, of said metallic flakes by weight of said layer.

The individual layer of the article may have a thickness of from about 0.1 mm to about 50 mm, preferably from about 0.3 mm to about 30 mm, more preferably from about 0.5 mm to about 20 mm, most preferably from about 0.6 mm to about 10 mm, for example 0.7 mm, 0.8 mm, 0.9 mm, 1.0 mm, 3.0 mm, 5.0 mm, 7.0 mm, 9.0 mm or any ranges therebetween.

The individual layer of the article may have a so-called "sandwich" structure, i.e., there are at least three parallel regions (e.g., a first surface region, a middle region and a second surface region) from the top to the bottom in the cross-section (for example, cut along a plane which is perpendicular to the flow direction during the injection molding). Particularly, the first surface region and the second surface region are outward and consumer facing. In an embodiment, the first surface region and the second surface region have substantively the same characteristics.

The article according to the present disclosure may have a metallic appearance, preferably wherein the molded article is characterized by:
  i) a Glossiness Value of from 50 to 500, preferably from 70 to 300, more preferably from 90 to 250, most preferably from 100 to 200, in which Glossiness Value is measured by the Method for Glossiness; and/or
  ii) a Dullness Value of from 10 to 100, preferably from 20 to 80, more preferably from 30 to 70, most preferably from 35 to 65, in which Dullness Value is measured by the Method for Dullness; and/or
  iii) a Flop Index of from 1 to 50, preferably from 5 to 40, more preferably from 10 to 35, most preferably from 13 to 30.

The article according to the present disclosure may be an injection molded article, an injection blow molded article or an injection stretch blow molded article.

Thermoplastic Materials

An article of the present invention, or where the article is formed of layers, a layer of the article, comprises more than 50% of a thermoplastic resin, selected from the group consisting of said thermoplastic material comprises polypropylene (PP), chlorinated polypropylene (CPP), high density polyethylene (HDPE), ultra-high molecular weight polyethylene (UHMWPE), medium density polyethylene (MDPE), low density polyethylene (LDPE), linear low density polyethylene (LLDPE), chlorinated polyethylene (CPE), ethylene-propylene copolymer, polymethylpentene (PMP), cyclic olefin copolymer (COC), polyvinylchloride (PVC), chlorinated polyvinylchloride (CPVC), polyvinyl dichloride (PVDC), polystyrene (PS), acrylonitrile styrene (AS), acrylonitrile butadiene styrene (ABS), polyacrylonitrile (PAN), styrene butadiene copolymer (SBC), polymethyl Methacrylate (PMMA), polyamide (PA), polyethylene terephthalate (PET), glycol modified polyethylene terephthalate (PETG), polycyclohexylenedimethylene terephthalate (PCT), glycol-modified PCT copolymer (PCTG), copolyester of cyclohexanedimethanol and terephthalic acid (PCTA), polybutylene terephthalate (PBT), polyethylene naphthalate (PEN), polycarbonate (PC), cellulosic plastics, polylactide (PLA), polybutylene adipate-co-terephthalate (PBAT), Polybutylene succinate (PBS), polybutylene succinate adipate (PBSA), Polycaprolactone (PCL), thermoplastic starch (TPS), polyvinyl alcohol (PVA), chitosan, polyhydroxyalkanoates (PHA), ethylene methacrylic acid copolymer with zinc (Zn), sodium (Na), lithium (Li) or other metal ions, thermoplastic elastomers (TPE) including but not limited to styrene-butadiene-styrene block copolymer (SBS), Styrene-Isoprene-Styrene copolymer (SIS), styrene-ethylene-butylene-styrene block copolymer (SEBS), Styrene-Ethylene-Propylene-Styrene copolymer (SEPS), Thermoplastic olefin (TPO), Thermoplastic Vulcanizate (TPV), Thermoplastic polybutadiene (TPB), Thermoplastic polyisoprene (TPI), Thermoplastic polyvinylchloride (TPVC), Thermoplastic chlorinated polyethene (TCPE), Thermoplastic polyurethane elastomer (TPU), Thermoplastic polyester elastomer (TPEE), Thermoplastic polyamide elastomer (TPAE), Thermoplastic Fluoride (TPF), Thermoplastic silicone vulcanizate (TPSiV), copolymers thereof, or any combinations thereof.

In some embodiments, the article according to the present invention may comprise polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), or a polyolefin, for example one of low-density polyethylene (LDPE), linear low-density polyethylene (LLPDE), high-density polyethylene (HDPE), propylene (PP) and a combination thereof.

In some embodiments, the article according to the present invention may comprise polyethylene terephthalate (PET), polystyrene (PS), polycarbonate (PC), polyvinylchloride (PVC), polyethylene (PE), polypropylene (PP), or any combinations thereof, preferably PP, PE, PS or any combinations thereof, more preferably PP, PE or any combination thereof.

Metallic Flakes

The metallic flakes according to the present invention may have a shape of thin sheet (for example, the aspect ratio may be at least 2). Particularly, the metallic flakes according to the present invention may be characterized by:
  i) an average maximum diameter of from 1 μm to 100 μm, preferably from 3 μm to 50 μm, more preferably from 5 μm to 30 μm, and most preferably from 7 μm to 20 μm, for example 5 μm, 6 μm, 7 μm, 8 μm, 9 μm, 10 μm, 12 μm, 14 μm, 16 μm, 18 μm or any ranges therebetween; and/or
  ii) an average thickness of from 0.01 μm to 10 μm, preferably from 0.05 μm to 1 μm, more preferably from 0.10 μm to 0.50 μm, and most preferably from 0.15 μm to 0.35 μm, for example 0.10 μm, 0.12 μm, 0.14 μm, 0.16 μm, 0.18 μm, 0.20 μm, 0.22 μm, 0.24 μm, 0.26 μm, 0.28 μm or any ranges therebetween; and/or
  iii) an aspect ratio of an average diameter to an average thickness ranging from 3 to 1,000, preferably from 5 to 500, more preferably from 10 to 200, and most preferably from 30 to 100, for example 10, 15, 18, 20, 25, 30, 35, 40, 45, 50, 55, 60, 65, 70, 80, 90 or any ranges therebetween.

In some embodiments, a preferred size and shape (e.g., having a shape of thin sheet and/or having a preferred aspect ratio) of metallic flakes may provide an even preferred metallic-looking and an additional benefit, for example recyclability. Without wishing to be bound by any theory, it is believed that a preferred size and shape may contribute to the formation of the significant "sandwich" structure, which brings about an improved metallic appearance by influencing light reflection and scattering. If metallic flakes are too large, recyclability might be impossible due to adverse effects on devices for recyclability. If metallic flakes are too thin, it would possibly deform during the molding, resulting in reduction of metallic-looking. If metallic flakes are too thick, it would result in increased dosage of metallic flakes that is not desirable from the perspective of cost and recyclability.

Furthermore, the metallic flakes may comprise a core and an organic coating outside said core, in which said core may comprise a metal and/or an oxide thereof and said organic coating may comprise silicone, PE wax, PP wax, styrene-maleic anhydride copolymer, terpene resin, stearates, mineral oil, siloxanes or any combinations thereof. Preferably, the coating may comprise PE wax, PP wax, siloxanes or any combinations thereof. The presence of coating may contribute to the formation of the significant "sandwich" structure and/or the improved metallic appearance.

In some embodiments, the metallic flakes may be combined with various colorant pigments, including yellow, gold, red, green, blue, and the like as well as some special effect masterbatch, including pearlescent, or other additives.

Adjunct Agents

The article comprises from about 0.1%, 0.3%, 0.5% or 1% to about 5%, 10%, 15% or 20% by weight of the article or a layer of the article, of an adjunct agent. The amount of adjunct agent present in the article is relatively low to ensure structural integrity and to allow ease and efficiency of recycling.

A wide variety of adjunct agents are suitable for use herein. In one embodiment, the adjunct agent may be an internal lubricant and/or peroxide. Particularly, the layer further comprises from 0.1% to 5%, of an internal lubricant, preferably ethylene bis(stearamide) and/or peroxide, by weight of said layer. Without wishing to be bound by any theory, the addition of internal lubricant and/or peroxide would be helpful in forming the three-layered structure by reducing the viscosity of resin.

In other embodiments, some adjunct agents may be preferred due to other characteristics, including but not limited to: physical state under ambient temperature (namely, liquid or solid or gas), odour characteristic, commercial availability, cost, etc.

Preferably, the adjunct agent is selected from the group consisting of an alcohol, oil, siloxane fluid, water, and a combination thereof.

In one embodiment, the adjunct agent is an alcohol preferably selected from the group consisting of a diol, triol, and a combination thereof. More preferably, the alcohol is selected from the group consisting of ethylene glycol, propylene glycol, glycerol, butanediol, butanetriol, poly(propylene glycol), derivatives thereof, and a combination thereof. Most preferably, the adjunct agent is glycerol.

In another embodiment, the adjunct agent is an oil selected from the group consisting of a plant oil, an animal oil, a petroleum-derived oil, and a combination thereof. For example, the adjunct agent could be an animal oil selected from the group consisting of tallow, lard, and a combination thereof. Preferably the adjunct agent is a plant oil selected from sesame oil, soybean oil, peanut oil, olive oil, castor oil, cotton seed oil, palm oil, canola oil, safflower oil, sunflower oil, corn oil, tall oil, rice bran oil, derivative and combinations thereof.

In a further embodiment, the adjunct agent is a siloxane fluid and may be a linear or branched polymer or copolymer. For example, the siloxane fluid may be a diorganosiloxane having one or more pendant or terminal groups selected from a group consisting of hydroxyl, vinyl, amine, phenyl, ethyl and mixtures thereof. Other suitable siloxane fluids include polydimethylsiloxane homopolymers, copoloymers consisting essentially of dimethylsiloxane units and methylphenylsiloxane units, copolymers consisting essentially of diphenylsiloxane units and methylphenylsiloxane units. Mixtures of two or more of such siloxane fluid polymers and copolymers may be used.

In an embodiment, the adjunct agent is siloxane fluid, preferably polydimethylsiloxane.

In some other embodiments, the article of the present invention may comprise titanium dioxide, pearlescent agent, filler, cure agent, anti-statics, UV stabilizer, anti-oxidant, anti-block agent, catalyst stabilizer, colourants, nucleating agent, or a combination thereof.

Process of the Manufacturing

The molded article of the present invention may be prepared by an injection molding (IM) process, an injection blow molding (IBM) process or an injection stretch blow molding (ISBM) process. Injection molding is a manufacturing process for producing parts by injecting molten thermoplastic material into a mold. In IBM or ISBM, the thermoplastic materials are injected into a mold to form a preform and then, the preform is blown or stretch and blown into an article.

Particularly, there is provided a process for making the molded article according to the present invention, comprising the steps of: a) mixing a thermoplastic material and metallic flakes to form a blend, in which the blend comprises from 80% to 99.99% of said thermoplastic material and from 0.01% to 20% of said metallic flakes by weight of said blend; and b) injecting said blend obtained in step a) in a mold to form the molded article. In some embodiments, the metallic flakes may be characterized by: i) an average maximum diameter of from 1 µm to 100 µm, preferably from 3 µm to 50 µm, more preferably from 5 µm to 30 µm, and most preferably from 7 µm to 25 µm; and/or ii) an average thickness of from 0.01 µm to 10 µm, preferably from 0.05 µm to 1 µm, more preferably from 0.10 µm to 0.30 µm, and most preferably from 0.15 µm to 0.35 µm; and/or iii) an aspect ratio of an average diameter to an average thickness ranging from 3 to 1000, preferably from 5 to 500, more preferably from 10 to 200, and most preferably from 30 to 100; and/or iv) said metallic flakes comprise a core and an organic coating outside said core, in which said core comprises a metal and/or an oxide thereof and said organic coating comprises silicone, PE wax, PP wax, styrene-maleic anhydride copolymer, terpene resin, stearates, mineral oil, siloxanes or any combinations thereof.

The IM, IBM, ISBM process may be carried out by using any known method. In an exemplary embodiment, the IM process is carried out as follows:

Device: Haitian SA600-130120

Temperature setting: 1st stage at 190° C., 2nd stage at 180° C., 3rd stage at 180° C., 4th stage at 170° C.

Injection pressure: 120 MPA

Screw speed: 25 G/S.

Total cycle time: 57 s

Test Method

1. Optical Microscopy

The optical microscope image is acquired following the steps below:
1) The sample is prepared by cutting the article (for example, a bottle) along a direction that is perpendicular to the flow direction of the injection molding process.
2) The cross-section surface which is perpendicular to the flow direction, is further cut using the Leica Microtome RM2255 with a diamond knife to obtain a smooth surface.
3) The cross-section of the sample was observed using a light microscope (Olympus EX51) with a magnification of 20×.
4) The image of sample cross section was captured using the software of the light microscope and saved in jpg format for further analysis. Multiple photos are taken so as to cover the whole thickness of the article. Then, the multiple optical microscope images are stitched to show the whole thickness of the article.

2. Scanning Electron Microscopy (SEM)

The SEM image is acquired following the steps below:
1) The sample is prepared by cutting the article (for example, a bottle) along a direction that is perpendicular to the flow direction of the injection molding process.
2) The cross-section surface which is perpendicular to the flow direction, is further cut using the Leica Microtome RM2255 with a diamond knife to obtain a smooth surface.
3) The cross-section of the sample was coated with Pt using the HITACHI E-1045 ION SPUTTER. The work condition is time: 120 second; Current: 15 mA.
4) The SEM image is obtained using the HITACHI 54800. The working condition is: Accelerate Voltage: 3 kV. Multiple photos are taken, especially for the area close to the surface and the area in the middle.
5) The parameters for the size of metallic flakes including the average maximum diameter (i.e., the average value of the maximum diameter of metallic flakes), the average thickness and D/T aspect ratio is determined by the software in the device.

3. Metallic Flakes Measurements

Middle Flake Density is a measure of the overall of concentration and orientation of metallic flakes in the middle portion of the molded layer according to the present invention.

Surface Flake Density is a measure of the overall of concentration and orientation of metallic flakes in the surface portion of the molded layer according to the present invention. Middle Flake Density and Surface Flake Density are determined by the following method:
1) The stitched optical image of a cross-section of a layer of a molded article is imported in the Image J 1.52p (National Institutes of Health, USA);
2) The stitched optical image is converted into a binary image by using the automatic RenyiEntropy method, in which metallic flakes are shown as black particles (where the gray level is set as metallic flake: gray level=255; background: gray level=0);
3) The binary image is analyzed by detecting black particles, in which the detection is carried out in the following five regions successively positioned along the thickness of the layer: a first surface region adjacent to the first surface (region 1), a first inner region adjacent to the first surface region (region 2), a middle region (region 3), a second inner region adjacent to the middle region (region 4) and a second surface region adjacent to the second surface (region 5), wherein each of these five regions has the same thickness being 20% of the whole thickness of the layer; The total flake area in each region is noted as FA_R1 (total flake area in region 1), FA_R2 (total flake area in region 2), FA_R3 (total flake area in region 3), FA_R4 (total flake area in region 4), FA_R5 (total flake area in region 5).
4) Middle Flake Density is calculated as:

Middle Flake Density =
$$\frac{FA\_R3}{FA\_R1 + FA\_R2 + FA\_R3 + FA\_R4 + FA\_R5} * 100\%$$

5) Surface Flake Density is calculated as:

Surface Flake Density =
$$\frac{(FA\_R1 + FA\_R5)/2}{FA\_R1 + FA\_R2 + FA\_R3 + FA\_R4 + FA\_R5} * 100\%$$

Surface Flake Orientation is a measure of the orientation of metallic flakes in the surface portion of the molded layer according to the present invention. Middle Flake Orientation is a measure of the orientation of metallic flakes in the middle portion of the molded layer according to the present invention, where the orientation parallel to flow direction of the injection molding is defined as 0° and the orientation perpendicular to the direction of the injection molding is defined as 90°. Surface Flake Orientation is a measure of the orientation of metallic flakes in the surface portion of the molded layer according to the present invention, where the orientation parallel to flow direction of the injection molding is defined as 0° and the orientation perpendicular to the direction of the injection molding is defined as 90°. Middle Flake Orientation and Surface Flake Orientation are determined by the following method:
1) The stitched light microscope image of a cross-section of a layer of a molded article is imported in the Image J 1.52p (National Institutes of Health, USA);
2) The stitched light scope image is converted into a binary image, using the automatic RenyiEntropy method, in which metallic flakes are shown as black particles (where the gray level is set as metallic flake: gray level=255; background: gray level=0);
3) In the "Set Measurement" module, tick the "Fit ellipse" option to calculate the major axis angle and major axis length of individual flakes.
4) The major axis angle and major axis length of each flake are analyzed using the "Analyze Particle" module in Image J.
5) The orientation in each region (i.e., regions 1-5 as mentioned above) is calculated by doing the vector sum of all flakes in this region, where so-called parallelogram law gives the rule for vector addition of two or more vectors. For example, Surface Flake Orientation is calculated as the average of the values for region 1 and region 5. For two vectors, the vector sum is obtained by placing them head to tail and drawing the vector from the free tail to the free head. For each flake, the vector angle is the major axis angle and the vector distance is the major axis length obtained in the previous step.

4. SAMBA Glossiness

SAMBA Glossiness is a measure of glossiness for a metallic article. An active polarization camera system called SAMBA is used to measure the specular SAMBA glossiness of the molded article. The system is provided by Bossa Nova Technologies and a polarization imaging software named VAS (Visual Appearance Study software, version 3.5) is used for the analysis. The front labeling panel part of the container is tested against an incident light. An exposure time of 15 milliseconds (ms) is used.

The incident light is reflected and scattered by the article. The specular reflected light keeps the same polarization as the incident light and the volume scattered light becomes un-polarized. SAMBA acquires the polarization state of a parallel image intensity (P) contributed by both the reflected and scattered light, and a crossed image intensity (C) of the image contributed only by the scattered light. This allows the calculation of SAMBA glossiness G given by G=P−C.

5. Flop Index

Flop Index or "FI" is the characterization of color luminosity change, and it is another very important measure for metallic appearance. Particularly, FI indicates the lightness change at different scattering angles. It can be mathematically calculated by the following formula:

$$\text{Flop Index} = \frac{2.69(L^*_{15°} - L^*_{110°})^{1.11}}{(L^*_{45°})^{0.86}};$$

wherein an incident light that is 45° to the surface, and the mirror reflection direction is symmetrically on the other side of the normal line which is perpendicular to the surface. $L^*_{15°}$ describes the luminosity at the angle which is 15° to the normal line from the reflection direction, and $L^*_{110°}$ is 110° to the normal line from the reflection direction. $L^*_{45°}$ is the normal line which is perpendicular to the surface. Flop Index indicates the L changes with different observation angles and higher FI means more dark and light contrast and thus more evident effect.

H can be measured following ASTM E2539. Suitable measuring device include multi angle photometer MA98 from X-rite Company.

6. Dullness

Dullness is a measure of a degree of dullness (i.e., orange-peel-like) for a metallic article. Dullness is measured using a Micro-wave-scan instrument provided by BYK-Gardner company, following the manufacturer's instructions. The dullness caused by micro waviness of surface is evaluated by changes of intensity of light reflection around an image edge that is projected on the surface of a sample container. Lower dullness data leads to a higher glossy effect. Mathematically, dullness can be described as $$\frac{\text{Scattering}}{\text{Max in center}} = \text{Dullness}$$

The test for measuring dullness is non-destructive as the micro-wave scan instrument is used to directly measure the dullness on the surface of the bottle. The micro-wave-scan instrument is held perpendicular to the bottle surface such that the measurement aperture of instrument is fully covered, and a laser is projected onto the bottle surface before a reading is noted from the instrument. For each sample, 6 readings are taken at 6 randomly selected positions, 3 at the front surface and 3 at the back surface of the bottle, while the bottle is held flat to ensure the measurement aperture of the instrument is completely covered. The arithmetic average of these 6 readings is reported as the dullness reading The Examples herein are meant to exemplify the present invention but are not used to limit or otherwise define the scope of the present invention.

EXAMPLES

Example 1: Improved Metallic Appearance of the Molded Articles According to the Present Invention Compared to Commercially Available Molded Articles i. Improved Metallic Appearance of the Inventive Molded Articles Injection molded articles including Articles 1-2 and Comparative 1 are prepared by a conventional IM process as shown in the following table. Comparative 2 is a commercially available PP article with a coating of aluminum obtained by a painting process (the lower part of Olay Magnetic Infuser, silver).

TABLE 1

| | IM process |
| --- | --- |
| Device | Haitian SA600 - 130120 |
| Temperature setting | $1^{st}$ stage at 190° C., $2^{nd}$ stage at 180° C., $3^{rd}$ stage at 180° C., $4^{th}$ stage at 170° C. |
| Injection pressure | 120 MPA |
| Screw speed | 25 G/S |
| Total cycle time | 57 s |
| Mold | Olay 30 ml Jar mold, single cavity, smooth finish A1 and 1 mm thickness |

Article 1 is prepared with 98% of polypropylene resin (H9018 from Lanzhou Sinopec, China) and 2% of a masterbatch containing aluminum flakes (obtained from Xuyang Aluminum Paints Ltd, Hefei, China) in which the percentage of metallic flakes in the article is calculated as 1.4% by the dosage of masterbatch containing metallic flakes times the percentage of metallic flakes in the masterbatch (i.e., 70%). Article 2 is prepared with 98% of polypropylene resin (H9018 from Lanzhou Sinopec, China) and 2% of a masterbatch containing aluminum flakes (obtained from Shinemax Advanced Materials Co. Ltd. Shenzhen, China) in which the percentage of metallic flakes in the article is calculated as 1.4% by the dosage of masterbatch containing metallic flakes times the percentage of metallic flakes in the masterbatch (i.e., 70%). Additionally, Articles 1 and 2 are single-layer articles. Comparative 1 is prepared with a compound resin containing PP and spherical aluminum particles (under the commercial reference of 340 available from Eckart GmbH, Hartenstein, Germany). The physical characteristics of Articles 1 and 2 obtained from the manufacturers and also confirmed by SEM are shown in the following table. Additionally, the aluminum flakes in Article 2 comprise an organic coating that may be selected from the group consisting of PE, terpene resin, stearates, silicone and combinations thereof.

TABLE 2

| Samples | Average Maximum Diameter (μm) | Average Thickness (μm) | D/T aspect ratio | Percentage of metallic flakes in the sample* |
|---|---|---|---|---|
| Metallic Flakes used in Article 1 | 30-50 | 0.5-2.0 | 50-100 | 1.4% |
| Metallic Flakes used in Article 2 | 10-20 | 0.2-0.4 | 50-100 | 1.4% |

*the percentage of metallic flakes in the sample may be calculated from the dosage of masterbatch containing metallic flakes and the percentage of metallic flakes in the masterbatch.

In order to evaluate the metallic appearance of the molded articles according to the present invention, Articles 1-2 and Comparatives 1-2 are randomly distributed to ten trained panelists. The panelist scored the metallic appearance on a 0 to 10 scale (0=no metallic appearance and 10=extremely strong metallic appearance). The average scores are shown below.

TABLE 3

|  | Article 1 | Article 2 | Comparative 1 | Comparative 2 |
|---|---|---|---|---|
| Average Score | 3.0 | 4.7 | 1.7 | 6.8 |

The results indicate that the molded articles according to the present invention (e.g., Articles 1 and 2) have an improved metallic appearance compared to commercially available molded article (Comparative 1) containing metallic flakes distributed within the thermoplastic materials. On the other hand, the molded articles according to the present invention are significantly favorable in terms of recyclability and cost compared to the article obtained by a painting process, although it is a bit less preferred in term of metallic appearance (Comparative 2). Therefore, the molded articles according to the present invention may achieve a balance between the metallic appearance and the recyclability as well as a balance between the metallic appearance and the cost. As such, they are very promising as a metallic packaging for consumer goods.

ii. A Significant Sandwich Structure in the Cross-Section of the Inventive Molded Articles The inventor surprisingly discovered the molded articles according to the present invention (e.g., Articles 1 and 2) has a significant "sandwich" structure in their cross-sections.

Figure 1A:
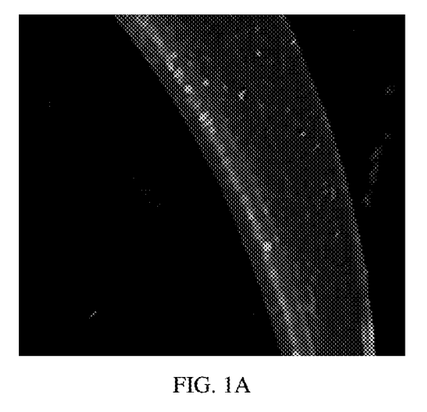
FIGS. 1A and 1C show imaging of cross-sections of molded articles under optical microscopy.
Figure 1B:
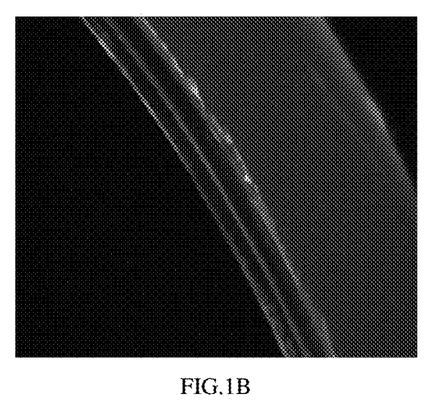
Figure 1C:
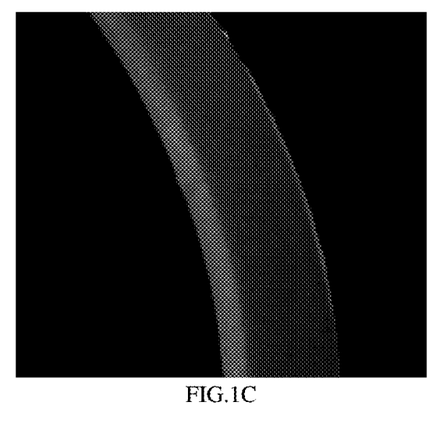

Optical images of the cross-sections of Article 1 (FIG. 1A), Article 2 (FIG. 1B), Comparative 1 (FIG. 1C) are taken according to Test Method 1: Optical Microscopy. As shown in FIGS. 1A and 1B, there is a very bright line in the middle of the cross-section image of the inventive molded article in which the cross-section image is along the direction that is perpendicular to the flow direction during the injection molding process. There is no clear bright line in the middle of the cross-section image of Comparative 1, as shown in FIG. 1C.

Figure 2A:
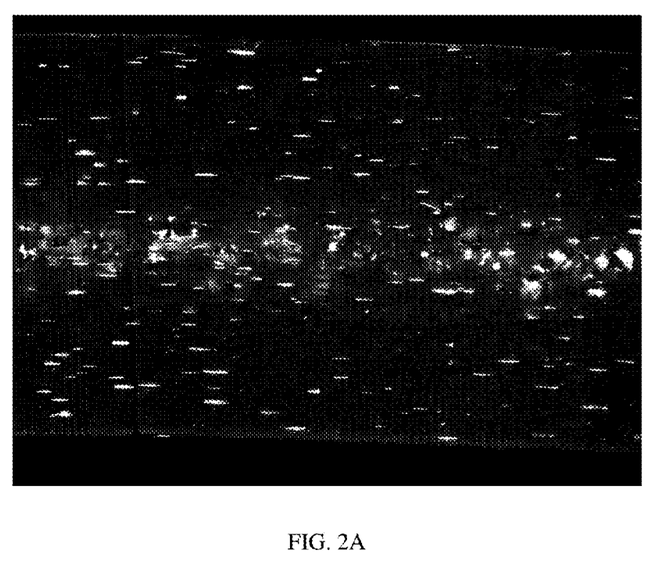
FIGS. 2A and 2B show 20× optical microscopy imaging of a cross-section of two inventive molded articles.
Figure 2B:
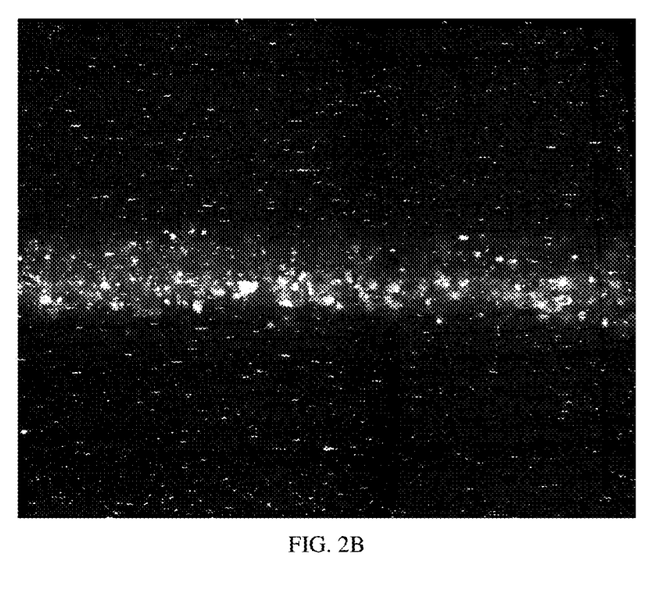

FIGS. 2A and 2B show stitched 20× optical imaging of the whole cross-section of Article 1 (FIG. 2A) and Article 2 (FIG. 2B) having the same percentage of aluminum flakes (i.e., 1.4%) according to Test Method 1. It clearly indicates the bright line results from a significant sandwich structure in the cross-section of the molded article according to the present invention.

Figure 3A:
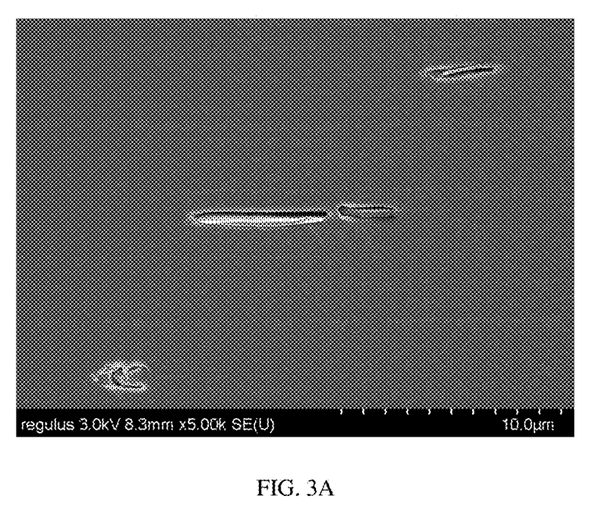
FIG. 3A shows an oriented metallic flake close to the surface and FIG. 3B shows an unoriented metallic flake in the middle.
Figure 3B:
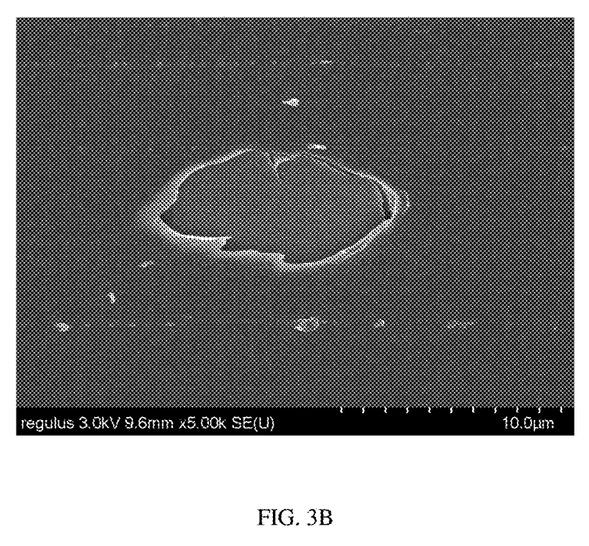

FIGS. 3A and 3B show SEM imaging of metallic flakes in Article 2, in which FIG. 3A shows an oriented metallic flake close to the surface and FIG. 3B shows an unoriented metallic flake in the middle. The metallic flake that is close to the surface is very thin in the SEM image because the maximum surface thereof is parallel to the surface of the article, while the metallic flake that is in the middle shows a greater area in the SEM image because the maximum surface thereof is parallel to the cross-section (i.e., the plane that is perpendicular to the flow direction of the injection molding). It indicates that the sandwich structure in the cross-section results from metallic flakes are oriented in the portion close to the surface and metallic flakes are mostly in a traverse direction in the middle portion (i.e., the maximum surfaces of metallic flakes are not parallel to the surface of the molded article, but parallel to the plane that is perpendicular to the flow direction of the injection molding).

iii. Characterization of the Sandwich Structure

In order to further characterize the sandwich structure, Middle Flake Density and Surface Flake Density as well as Surface Flake Orientation are determined for Articles 1-2 according to Test Method 3: Metallic flakes Measurements. The results are shown in the following table, in which the ratio of Middle Flake Density to Surface Flake Density of Articles 1-2 is much higher than 1 (the value of 1 indicates a uniform distribution), indicating that the presence of the "sandwich" structure. Furthermore, Articles 1-2 have very low Surface Flake Orientation, indicating the surface portion of both samples contains oriented metallic flakes (i.e., the maximum surfaces of metallic flakes are parallel to the surface of the article).

Furthermore, Article 2 achieves even more significant "sandwich" structure compared to Article 1 (12.3 vs 5.4) under the same dosage of metallic flakes.

TABLE 4

| Samples | Middle Flake Density | Surface Flake Density | Ratio of Middle to Surface | Surface Flake Orientation (°) |
|---|---|---|---|---|
| Article 1 | 54 | 10 | 5.4 | 4 |
| Article 2 | 74 | 6 | 12.3 | 6 |

Without wishing to be bound by any theory, it is believed that the special "sandwich" structure may result from a particular shape (for example, a shape of small, thin sheets) and/or composition (for example, the presence of a coating) of metallic flakes. Furthermore, an even more significant "sandwich" structure may result from a more particular shape (for example, smaller and thinner flakes) and/or composition (for example, the presence of an organic coating) of metallic flakes.

iv. Quantitative Evaluation of the Improved Metallic Appearance Achieved by the Inventive Molded Articles In order to evaluate the metallic appearance of the molded articles according to the present invention, SAMBA Glossiness and Flop Index (FI) are determined for the molded article according to the present invention (Articles 1 to 2) according to Test Method 4: SAMBA Glossiness, and 5: Flop Index. The results are shown in the following table.

TABLE 5

| Samples | SAMBA | FI |
|---|---|---|
| Article 1 | 139 | 16.99 |
| Article 2 | 167 | 16.60 |

SAMBA Glossiness and FI are well recognized parameters to characterize the metallic appearance. It would be highly desirable for metallic articles to have high glossiness (i.e., a high SAMBA Glossiness value) and high FI.

Without wishing to be bound by any theory, it is believed that the improved metallic appearance may result from the presence of the "sandwich" structure. Particularly, the "sandwich" structure provides three aspects that may contribute to the metallic appearance, in which:
1) highly oriented metallic flakes in the surface area, which may generate the abundant total light reflection that is seen as a metallic effect;
2) appropriate density of metallic flakes in the surface area, which is not too high to compromise the smoothness of the surface so that the Glossiness remains high, and is not too low to compromise the light reflection so that the Flop Index remains high; and
3) higher flake density and disordered distribution in the middle, which may ensure the enough opacity (the opacity is also one of the important factors to determine the good metallic effect).

Furthermore, Article 2 shows an even better metal appearance (i.e., improved SAMBA Glossiness) compared to Article 1 under the same dosage of metallic flakes. Without wishing to be bound by any theory, it is believed that the further improved metallic appearance of Article 2 may result from the more significant "sandwich" structure as shown above.

Example 2: Dose-Dependent Effect of the Metallic Flakes in the Molded Article of the Present Invention In order to evaluate the "sandwich" structure and the metallic appearance of the molded articles with different percentages of metallic flakes, a series of molded articles having different dosages of the masterbatch (Article 3: 0.05%, Article 4: 0.1%, Article 5: 0.5%, Article 6: 2%, Article 7: 10%, and Article 8: 40%) are prepared by using polypropylene resin (H9018 from Lanzhou Sinopec, China) and the masterbatch of aluminum flakes (from Shinemax Advanced Materials Co. Ltd., Shenzhen, China) according to the method in the Example 1.

Figure 4A:
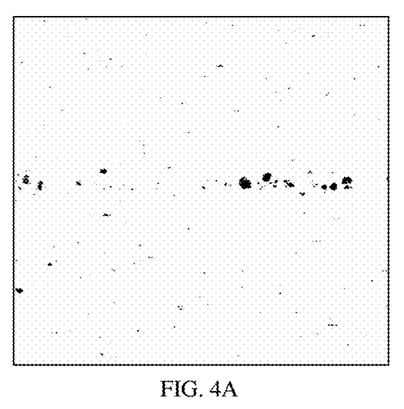
FIGS. 4A to 4D show binary 20× optical microscopy imaging of cross-sections of inventive molded articles having different dosages of masterbatches of metallic flakes (FIG. 4A: 0.5%.
Figure 4B:
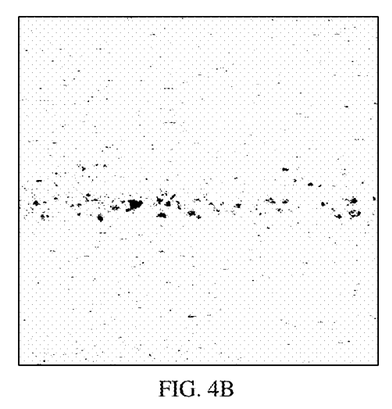
Figure 4C:
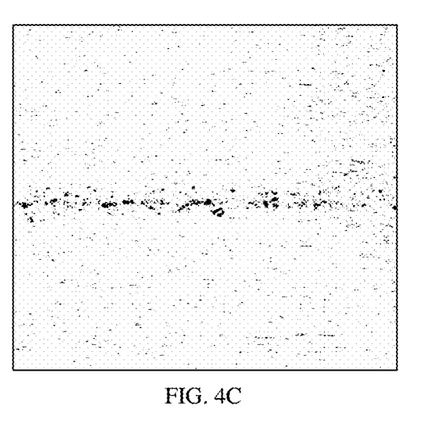
Figure 4D:
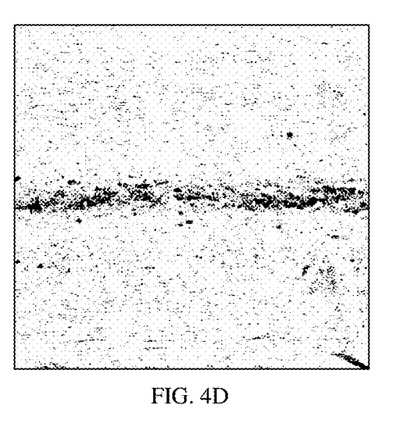

FIGS. 4A to 4D show binary stitched 20× optical imaging of cross-sections of Articles 5-8 (FIG. 4A: 0.5%; FIG. 4B: 2%; FIG. 4C: 10%; FIG. 4D: 40%) and the corresponding results of Middle Flake Density and Surface Flake Density as well as Surface Flake Orientation are shown in the following table. It indicates that such "sandwich" structure is present in the samples with the dosages of from 0.5% to 40% of metallic flake masterbatch. As the dosage increases, the "sandwich" structure becomes less significant (i.e., Ratio of Middle to Surface is reducing), but remains significant (i.e., at least more than 5).

TABLE 6

| Samples | Dosage of Masterbatch | Middle Flake Density | Surface Flake Density | Ratio of Middle to Surface | Surface Flake Orientation (°) |
| --- | --- | --- | --- | --- | --- |
| Article 3 | 0.05%* | NA | NA | NA | NA |
| Article 4 | 0.1% | NA | NA | NA | NA |
| Article 5 | 0.5% | 81 | 4 | 20.2 | 5 |
| Article 6 | 2% | 74 | 6 | 12.3 | 6 |
| Article 7 | 10% | 58 | 10 | 5.8 | 5 |
| Article 8 | 40% | 57 | 9 | 6.3 | 8 |

*At the level of 0.05% and 0.1%, the flake density cannot be accurately determined due to large variance.

Furthermore, SAMBA Glossiness, Flop Index (FI) and Dullness are determined for Articles 3 to 8. The results are shown in the following table. The results indicate a dosage of metallic flake masterbatch being from about 0.4% to about 5% would be preferred, because a lower dosage (for example, 0.1%) cannot provide a sufficient metallic appearance (usually, FI needs to be more than 10 for a metallic appearance) and a higher dosage (for example, 10%) would not further improve the metallic appearance but increase the cost due to much higher dosage of metallic flakes. This implies a more cost-effective dosage is present between 0.1% and 10%, probably between 0.4% and 5%. A dosage around 2% seems the most preferred.

TABLE 7

| Samples | Dosage of masterbatch | SAMBA | FI | Dullness |
| --- | --- | --- | --- | --- |
| Article 3 | 0.05% | 73.0 | 8.3 | NA* |
| Article 4 | 0.1% | 80.0 | 9.1 | NA |
| Article 5 | 0.5% | 133.0 | 12.5 | NA |
| Article 6 | 2% | 167.0 | 16.6 | NA |
| Article 7 | 10% | 185.0 | 17.1 | NA |
| Article 8 | 40% | NA | NA | NA |

*Dullness cannot be accurately determined due to large variance.

Another series of molded articles having different dosages of the masterbatch (Article 9: 0.05%, Article 10: 0.1%, Article 11: 0.5%, Article 12: 2%, Article 13: 10%, and Article 14: 40%) are prepared by using polypropylene resin (H9018 from Lanzhou Sinopec, China) and the masterbatch of aluminum flakes (from Shinemax Advanced Materials Co. Ltd., Shenzhen, China) similarly as in Example 1, but with a different mold (Pantene Shampoo & hair conditioner pump, 2-cavity, smooth finish Al and 2.1 mm thickness). SAMBA Glossiness, Flop Index (FI) and Dullness are determined for Articles 9 to 14. The results as shown in the following table indicate similar trend as above.

TABLE 8

| Samples | Dosage of masterbatch | SAMBA | FI | Dullness |
| --- | --- | --- | --- | --- |
| Article 9 | 0.05% | 67 | 7.68 | 22.2 |
| Article 10 | 0.1% | 84 | 8.36 | 19.4 |
| Article 11 | 0.5% | 100 | 13.99 | 38.6 |
| Article 12 | 2% | 166 | 15.43 | 48.5 |
| Article 13 | 10% | 156 | 15.68 | 55.8 |
| Article 14 | 40% | 94 | 13.45 | NA |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A molded article having at least one part that comprises at least one layer comprising:
    a) from 50% to 99.99% of a thermoplastic material by weight of said layer, and
    b) from 0.01% to 50% of metallic flakes by weight of said layer;
    wherein the layer exhibits a sandwich structure in which a ratio of Middle Flake Density of the layer over Surface Flake Density of the layer is at least 3, and
    wherein the metallic flakes have an aspect ratio of an average diameter to an average thickness being at least 2.

2. The molded article according to claim 1, wherein the ratio of Middle Flake Density of the layer over Surface Flake Density of the layer is from 3 to 1000.

3. The molded article according to claim 1, wherein the Middle Flake Density of the layer is from 30 to 100; and/or
    wherein the Surface Flake Density of the layer is from 0.1 to 20.

4. The molded article according to claim 1, wherein Surface Flake Orientation of the layer is no more than 20°.

5. The molded article according to claim 1, wherein said metallic flakes are characterized by:
    an average maximum diameter of from 1 μm to 100 μm; and/or
    an average thickness of from 0.01 μm to 10 μm; and/or
    an aspect ratio of an average diameter to an average thickness ranging from 3 to 1,000.

6. The molded article according to claim 1, wherein said layer comprises from 70% to 99.9% of said thermoplastic material by weight of said layer; and/or
    wherein said layer comprises from 0.1% to 30% of said metallic flakes by weight of said layer.

7. The molded article according to claim 1, wherein said thermoplastic material comprises material selected from the group consisting of polypropylene (PP), chlorinated polypropylene (CPP), high density polyethylene (HDPE), ultra-high molecular weight polyethylene (UHMWPE), medium density polyethylene (MDPE), low density polyethylene (LDPE), linear low density polyethylene (LLDPE), chlorinated polyethylene (CPE), ethylene-propylene copolymer, polymethylpentene (PMP), cyclic olefin copolymer (COC), polyvinylchloride (PVC), chlorinated polyvinylchloride (CPVC), polyvinyl dichloride (PVDC), polystyrene (PS), acrylonitrile styrene (AS), acrylonitrile butadiene styrene (ABS), polyacrylonitrile (PAN), styrene butadiene copolymer (SBC), polymethyl Methacrylate (PMMA), polyamide (PA), polyethylene terephthalate (PET), glycol modified polyethylene terephthalate (PETG), polycyclohexylenedimethylene terephthalate (PCT), glycol-modified PCT copolymer (PCTG), copolyester of cyclohexanedimethanol and terephthalic acid (PCTA), polybutylene terephthalate (PBT), polyethylene naphthalate (PEN), polycarbonate (PC), cellulosic plastics, polylactide (PLA), polybutylene adipate-co-terephthalate (PBAT), Polybutylene succinate (PBS), polybutylene succinate adipate (PBSA), Polycaprolactone (PCL), thermoplastic starch (TPS), polyvinyl alcohol (PVA), chitosan, polyhydroxyalkanoates (PHA), ethylene methacrylic acid copolymer with zinc (Zn), sodium (Na), lithium (Li) or other metal ions, thermoplastic elastomers (TPE) such as styrene-butadiene-styrene block copolymer (SBS), Styrene-Isoprene-Styrene copolymer (SIS), styrene-ethylene-butylene-styrene block copolymer (SEBS), Styrene-Ethylene-Propylene-Styrene copolymer (SEPS), Thermoplastic olefin (TPO), Thermoplastic Vulcanizate (TPV), Thermoplastic polybutadiene (TPB), Thermoplastic polyisoprene (TPI), Thermoplastic polyvinylchloride (TPVC), Thermoplastic chlorinated polyethene (TCPE), Thermoplastic polyurethane elastomer (TPU), Thermoplastic polyester elastomer (TPEE), Thermoplastic polyamide elastomer (TPAE), Thermoplastic Fluoride (TPF), Thermoplastic silicone vulcanizate (TPSiV), copolymers thereof, or any combinations thereof.

8. The molded article according to claim 1, wherein said metallic flakes comprise a metal and/or an oxide thereof selected from the group consisting of aluminum and/or an oxide thereof, copper and/or an oxide thereof, silver and/or an oxide thereof, gold and/or an oxide thereof, palladium and/or an oxide thereof, chrome and/or an oxide thereof, or any combinations thereof.

9. The molded article according to claim 1, wherein said metallic flakes comprise a core and an organic coating outside said core, in which said core comprises a metal and/or an oxide thereof and said organic coating comprises a material selected from the group consisting of silicone, PE wax, PP wax, styrene-maleic anhydride copolymer, terpene resin, stearates, mineral oil, siloxanes or any combinations thereof.

10. The molded article according to claim 1, wherein the molded article has a metallic appearance, preferably wherein the molded article is characterized by:
    i) a Flop Index of from 1 to 50; and/or
    ii) a Glossiness Value of from 50 to 500, in which Glossiness Value is measured by the Method for Glossiness; and/or
    iii) a Dullness Value of from 10 to 100, in which Dullness Value is measured by the Method for Dullness.

11. The molded article according to claim 1, wherein said molded article is an injection molded article, an injection blow molded article or an injection stretch blow molded article.

12. The molded article according to claim 1, wherein said layer has a thickness of from 0.01 mm to 30 mm.

* * * * *